United States Patent
Baudoin

(10) Patent No.: US 10,208,543 B2
(45) Date of Patent: Feb. 19, 2019

(54) DRIVE SHAFT ASSEMBLY FOR DOWNHOLE MUD MOTOR CONFIGURED FOR DIRECTIONAL DRILLING

(71) Applicant: KLX ENERGY SERVICES LLC, Houston, TX (US)

(72) Inventor: Toby Scott Baudoin, Rayne, LA (US)

(73) Assignee: KLX Energy Services LLC, Houston, TX (US)

(*) Notice: Subject to any disclaimer, the term of this patent is extended or adjusted under 35 U.S.C. 154(b) by 143 days.

(21) Appl. No.: 15/069,016

(22) Filed: Mar. 14, 2016

(65) Prior Publication Data

US 2016/0273276 A1   Sep. 22, 2016

Related U.S. Application Data

(60) Provisional application No. 62/134,281, filed on Mar. 17, 2015.

(51) Int. Cl.
| | |
|---|---|
| *E21B 4/02* | (2006.01) |
| *E21B 17/00* | (2006.01) |
| *E21B 7/06* | (2006.01) |
| *F16C 3/02* | (2006.01) |

(52) U.S. Cl.
CPC ............ *E21B 17/00* (2013.01); *E21B 4/02* (2013.01); *E21B 7/06* (2013.01); *E21B 7/067* (2013.01); *F16C 3/023* (2013.01)

(58) Field of Classification Search
CPC ... E21B 17/00; E21B 4/02; E21B 7/06; E21B 7/067
See application file for complete search history.

(56) References Cited

U.S. PATENT DOCUMENTS

| | | | |
|---|---|---|---|
| 2,584,097 A | 1/1952 | Trbojevich | |
| 3,588,154 A | 6/1971 | Voight et al. | |
| 3,884,049 A | 5/1975 | Pauli | |
| 4,391,547 A * | 7/1983 | Jackson, Jr. ............. | E21B 4/02 403/286 |
| 4,772,246 A * | 9/1988 | Wenzel .................... | E21B 4/02 464/117 |

(Continued)

OTHER PUBLICATIONS

PCT Search Report and Written Opinion issued for related application PCT/US2016/022300, dated Jun. 3, 2016, 10 pages.

*Primary Examiner* — Giovanna C. Wright
*Assistant Examiner* — Yanick A Akaragwe
(74) *Attorney, Agent, or Firm* — Drinker Biddle & Reath LLP

(57) ABSTRACT

A driveshaft assembly comprises a cylindrical upper member, with one end of the upper member being connected to the rotor and an other end of the upper member having a plurality of torque transmitting profiles. An elongated central member has two ends, with each end having a plurality of torque transmitting profiles. A seat is retained within a central bore of the upper member, the seat having a curved end. A catch is retained within the central member, the catch having a curved end. The upper member transfers torque from the rotor to the central member via the torque transmitting profiles of the upper member and the torque transmitting profiles of the central member, and the curved end of the seat contacts the curved end of the catch while maintaining a gap between the other end of the upper member and the adjacent end of the central member.

19 Claims, 5 Drawing Sheets

(56) References Cited

U.S. PATENT DOCUMENTS

| | | | |
|---|---|---|---|
| 4,976,655 A | | 12/1990 | Hebert, Sr. |
| 5,000,723 A | * | 3/1991 | Livingstone .............. E21B 4/02 |
| | | | 464/140 |
| 5,135,060 A | | 8/1992 | Ide |
| 5,520,256 A | | 5/1996 | Eddison |
| 5,651,737 A | * | 7/1997 | Le Blanc ................ E21B 17/05 |
| | | | 464/106 |
| 6,039,652 A | | 3/2000 | Marks |
| 6,827,160 B2 | | 12/2004 | Blair et al. |
| 7,810,586 B2 | | 10/2010 | Cousins et al. |
| 8,033,920 B1 | | 10/2011 | Benson |
| 8,062,140 B2 | | 11/2011 | Wall et al. |
| 8,870,666 B1 | | 10/2014 | Leger et al. |
| 8,900,062 B2 | | 12/2014 | Nicol-Seto |
| 2009/0127000 A1 | * | 5/2009 | Cousins ................ E21B 17/046 |
| | | | 175/78 |
| 2010/0190561 A1 | * | 7/2010 | Falgout, Jr. ............. E21B 17/03 |
| | | | 464/157 |
| 2011/0005839 A1 | | 1/2011 | Marchand et al. |
| 2014/0251694 A1 | * | 9/2014 | Crane .................... E21B 7/046 |
| | | | 175/73 |
| 2014/0251695 A1 | | 9/2014 | Marchand et al. |
| 2015/0014059 A1 | * | 1/2015 | Perry ..................... E21B 4/006 |
| | | | 175/57 |
| 2015/0176342 A1 | | 6/2015 | Ficken |
| 2015/0368985 A1 | | 12/2015 | Eppink |

\* cited by examiner

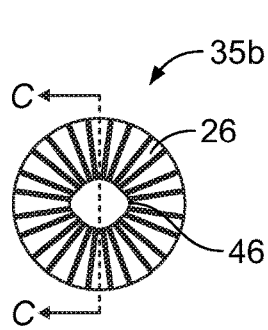
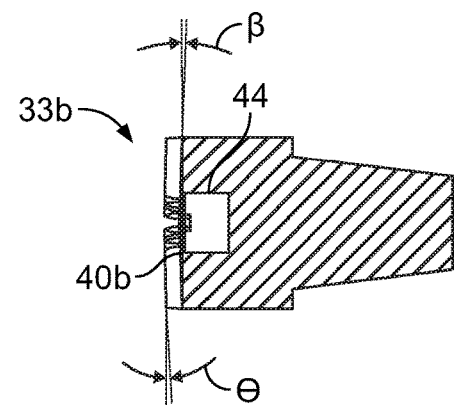
FIG. 7          FIG. 8
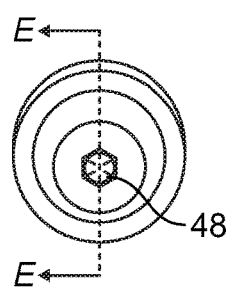
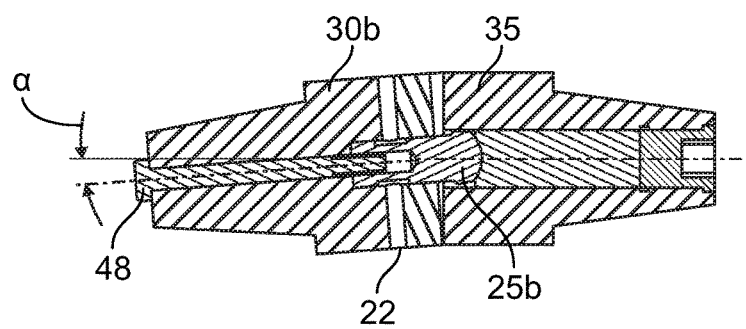
FIG. 9          FIG. 10
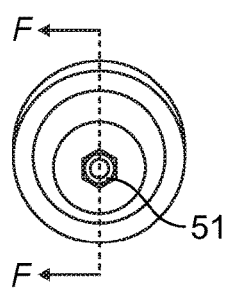
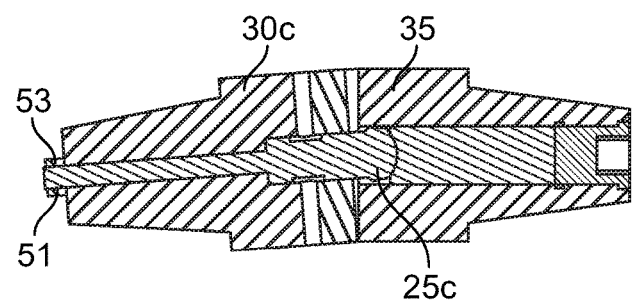
FIG. 11         FIG. 12

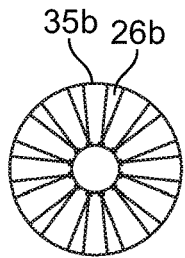
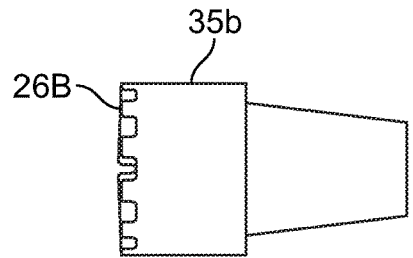
FIG. 13  FIG. 14
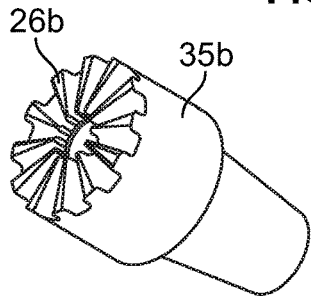
FIG. 15
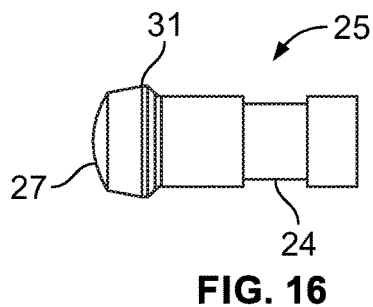
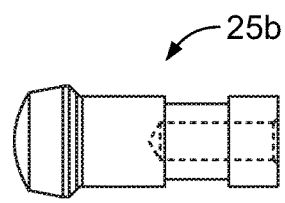
FIG. 16  FIG. 17
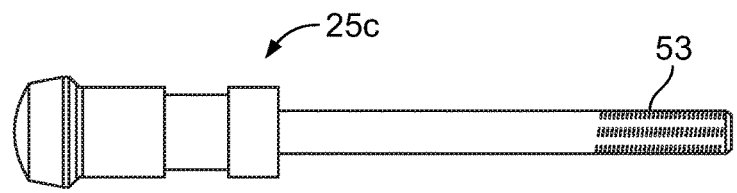
FIG. 18

DRIVE SHAFT ASSEMBLY FOR DOWNHOLE MUD MOTOR CONFIGURED FOR DIRECTIONAL DRILLING

CROSS-REFERENCES TO RELATED APPLICATIONS

This application claims the benefit of U.S. Provisional Patent Application No. 62/134,281, entitled "DRIVE SHAFT AND METHOD," and filed on Mar. 17, 2015, the disclosure of which is incorporated herein by reference.

FIELD OF THE DISCLOSURE

The present disclosure relates generally to downhole drilling equipment for oil and gas wells. More particularly, the present disclosure pertains to a drive shaft for a downhole mud motor, where the drive shaft transfers the torque and thrust loads from the rotor to the mud motor mandrel.

BACKGROUND

In the drilling of directional wellbores, conventional drilling methods of rotating a drill bit on the lower end of a pipe string is inadequate to create the curved portion of the borehole. Thus, mud motors, which include a bent section with a bend of curve of generally up to 3 degrees are used to drill the curved portions.

The conventionally used mud motors consist of three major components: a power section consisting of a rotor and a stator; a drive shaft; and a bearing assembly. The power section converts fluid pressure from the drilling fluid being pumped into rotational energy. The rotor is typically a helically fluted shaft that rotates eccentrically within the stator. The drive shaft must transfer the eccentric rotation and torque from the rotor to a concentric rotation and torque to the bearing assembly. The drive shaft must also transfer the thrust load from the rotor to the bearing assembly. The bend plane of the mud motor, used for directional drilling, generally lies within the drive shaft housing. Therefore, the drive shaft must also accommodate this bend. For these reasons, the drive shaft must be sufficiently robust to withstand the tremendous torque of the power section while having the ability to articulate in order to accommodate the eccentric rotation of the rotor and the bend in the drive shaft housing.

The vast majority of drive shafts in current mud motors fall within two main categories: constant velocity shafts and clutch type shafts. There are many variations of constant velocity shafts but all have the same characteristics are those used in automobile or All-Terrain Vehicle applications. In automobiles, for example, these constant velocity shafts are used in front wheel drive cars to connect the differential to the wheels to transfer torque, while accommodating varying angles of the suspension travel. These constant velocity shafts all use some type and number of balls or rollers to transfer torque while allowing some flexibility in their range of motion. These constant velocity shafts use many parts per assembly, including the torque transmitting items in addition to including sealing mechanisms. These sealing mechanisms often require multiple parts or special tooling for assembly. Most of these sealing mechanisms use some form of elastomeric seals which are simply ineffective in oil well downhole conditions of high temperature and pressures. These constant velocity shafts are very expensive and difficult to maintain.

Clutch type shafts are far simpler and require far fewer parts. However, these shafts provide a very crude and rough articulation due to only having two lobes per mating component. This greatly reduces the "smoothness" of the motions, thereby reducing efficiency and increasing wear. The two lob design is prone to significant wear during use due to the "rubbing" of mating surfaces. Attempts have been made to place hard metals on abutting surfaces to prolong the longevity of these shafts, but this does not resolve the issue causing the wear.

Therefore, due to disadvantages of prior art such as complexity of design, excessive wear, insufficient strength to transmit the required torques, or non-uniform rotation, there is a need for an improved drive shaft capable of withstanding the torque of power sections without being susceptible to the negative effects of these torque demands, or from high temperatures, high pressures, and other factors associated with a mud motor in a wellbore drilling environment.

SUMMARY

The present disclosure is generally directed to a downhole mud motor for directional drilling. The downhole mud motor consists of a power section consisting of a rotor and a stator, a driveshaft assembly threadedly connected to the power section, and a bearing assembly threadedly connected to the driveshaft assembly. The driveshaft assembly comprises a cylindrical upper member, with one end of the upper member being connected to the rotor of the downhole motor and an other end of the upper member having a plurality of torque transmitting profiles. An elongated central member has two ends, the two ends of the central member having a plurality of torque transmitting profiles. A seat may be retained within a central bore of the upper member, the seat having at least one curved end. A catch is retained within the central member, the catch having at least one curved end. The upper member transfers torque from the rotor to the central member via the torque transmitting profiles of the upper member and the torque transmitting profiles of the central member, and the curved end of the seat contacts the curved end of the catch while maintaining a gap between the other end of the upper member and the end of the central member.

The present disclosure is also generally directed to a driveshaft assembly for a downhole motor for directional drilling. The driveshaft assembly includes a cylindrical upper member, one end of the upper member being connected to a rotor of the downhole motor and an other end of the upper member having a plurality of torque transmitting profiles. An elongated central member has two ends, the two ends of the central member having a plurality of torque transmitting profiles. A seat is retained within a central bore of the upper member, the seat having at least one curved end. A catch is retained within the central member, the catch having at least one curved end. An angular displacement between the upper member and the central member is based on a radius of the curved end of the seat and a radius of the curved end of the catch.

Various additional embodiments are discussed with reference to the figures and the claims presented below.

BRIEF DESCRIPTION OF THE DRAWINGS

FIG. 7 is an end view of the upper member of an embodiment of the drive shaft apparatus, illustrating section line C-C.

FIG. 8 is a longitudinal cross-section view of the upper member of an embodiment if the drive shaft apparatus.

FIG. 9 is an end view of an embodiment of the drive shaft apparatus, illustrating section line E-E.

FIG. 10 is a longitudinal cross-section view of an embodiment of the drive shaft apparatus.

FIG. 11 is an end view of an embodiment of the driveshaft apparatus, illustrating section line F-F.

FIG. 12 is a longitudinal cross-section view of an embodiment of the drive shaft apparatus.

FIG. 13 is an end view of the upper member of an embodiment of the drive shaft apparatus.

FIG. 14 is an elevation view of the upper member of an embodiment of the drive shaft apparatus.

FIG. 15 is an angled view of the upper member of an embodiment of the drive shaft apparatus.

FIG. 16 is an elevation view of a catch according to an embodiment of the drive shaft apparatus.

FIG. 17 is an elevation view of a catch according to an embodiment of the drive shaft apparatus.

FIG. 18 is an elevation view of a catch according to an embodiment of the drive shaft apparatus.

Like reference numbers in the various drawings indicate like elements.

DETAILED DESCRIPTION

Figure 1:
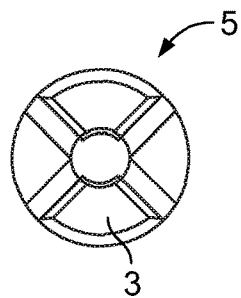
FIG. 1 is an end view of a prior art articulated drive shaft apparatus.

The following discussion is directed to various exemplary embodiments. However, one possessing ordinary skill in the art will understand that the examples disclosed herein have broad application, and that the discussion of any embodiment is meant only be exemplary of that embodiment, and not intended to suggest that the scope of the disclosure, including claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

Figure 2:
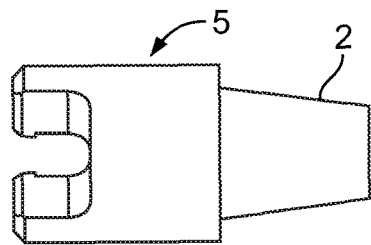
FIG. 2 is an elevation view of the articulated drive shaft apparatus shown in FIG. 1.

Referring now to FIGS. 1 and 2, a prior art drive shaft apparatus is illustrated. The prior art clutch type drive shaft 5 shown in FIG. 1 has a two-lobe configuration. FIG. 1 shows the end face of the drive shaft apparatus including the lobes 3. The drive shaft 5 is connected to the bearing assembly via a threaded connection 2 as shown in FIG. 2.

Figure 3:
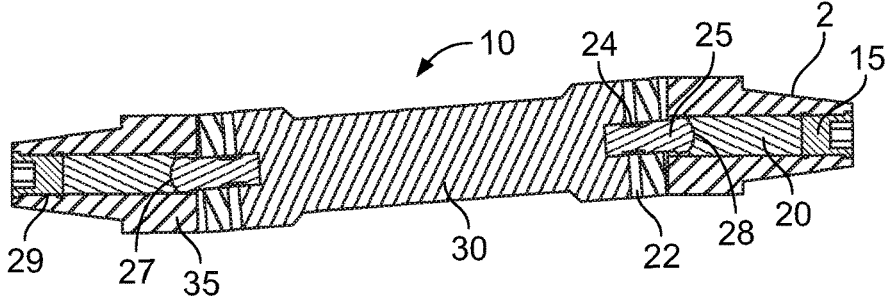
FIG. 3 is a longitudinal cross-section view of an embodiment of the drive shaft apparatus.

FIG. 3 illustrates a longitudinal cross-section view of a first embodiment of the drive shaft apparatus 10. The drive shaft apparatus 10 is comprised of an upper member 35, a central member 30, a seat 20, a catch 25, and a seat retainer 15. Although, FIG. 3 illustrates a seat retainer 15 in this embodiment, the seat retainer 15 may be omitted in other embodiments. A threaded connection 2 is typically used on the one or both ends of the drive shaft 10 to connect the drive shaft 10 to a mud motor rotor (not shown). A person skilled in the art will recognize that additional means of retention such as Morse tapers, hexes, or the like may be used instead of the threaded connection 2 to connect the drive shaft 10 to the mud motor rotor.

The drive shaft apparatus 10 shown in FIG. 3 includes two upper members 35 on each of the two ends of the central member 30, two seats 20 positioned within each of the two upper members 35, and two catches 25 positioned within each of the two ends of the central member 30, thereby forming two articulating joints. However, as illustrated in further embodiments discussed later, the drive shaft apparatus 10 may include a single upper member 35.

The upper member 35 is a cylindrical member with a threaded connection 2 on one end and torque transmitting profiles (discussed later) on the other end. The threaded connection 2 is for connection to the mud motor rotor. The upper member 35 is configured to transfer torque from the mud motor rotor to the central member 30 via the torque transmitting profiles on the one end of the upper member 35.

Figure 25:
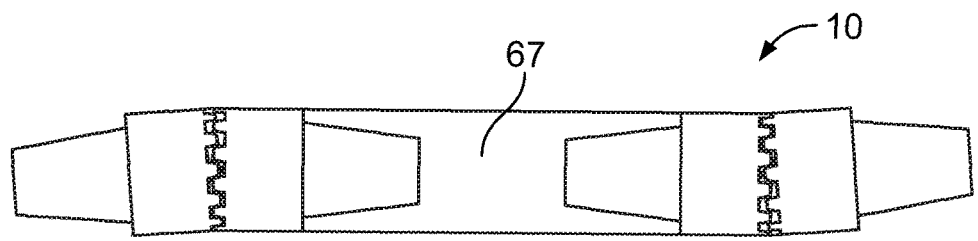
FIG. 25 is a longitudinal cross-section view of an embodiment of the drive shaft apparatus, illustrating an elongated central member configured as an assembly of multiple parts.

The central member 30 is an elongated member with torque transmitting profiles (discussed later) provided on each of its two ends. The central member 30 connects the joints from each end thus transmitting torque and thrust loads from one joint to the other. In the embodiment shown in FIG. 3, the central member 30 is shown as a single component. However, in other embodiments, the central member 30 may be comprised of multiple components coupled to each other as illustrated more clearly in FIG. 25. As will be understood by persons skilled in the art, having the central member 30 consist of multiple components provides additional benefits, including but not limited to, providing ease in maintenance of the parts. For instance, in the event of damage to a portion of the central member 30, the damaged component may be easily replaced without replacing the entire central member 30, thereby providing cost and time savings.

The catch 25 is retained within the central member 30 via one or more set screw(s) 22. However, in other embodiments, additional or alternative means of retention may be provided as discussed later. The catch 25 includes a curved end 27 as illustrated more clearly in FIGS. 16-22 (discussed below). The seat 20 is retained within a bore centrally located within the upper member 35 and is held in the correct position by the seat retainer 15. The seat retainer 15 is connected to the upper member 35 via a threaded connection discussed below with reference to FIG. 5. Although, the embodiment shown in FIG. 3 shows the seat 20 and the seat retainer 15 as separate components, a person skilled in the art will understand that the seat 20 and the seat retainer 15 may be manufactured as a single component. In an embodiment, the seat retainer 15 may be omitted. The seat 20 further includes a curved face 28 which corresponds to and engages with the curved end 27 of the catch 25 as shown in FIG. 3.

The curved end 27 of the catch 20 and the curved end 28 of the seat 25 are configured to contact each other. In an embodiment, the curved end 27 of the catch 25 is held firmly against the curved end 28 of the seat 20 via the thrust from the mud motor rotor.

Figure 22:
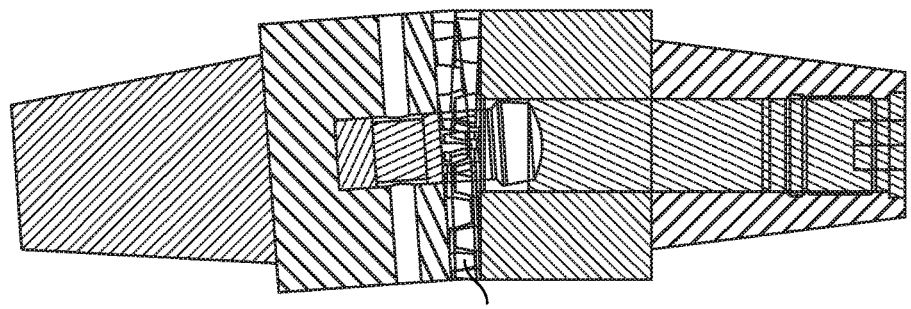
FIG. 22 is a longitudinal cross-section view of an embodiment of the drive shaft apparatus, illustrating the engagement of the torque transmitting profiles (splines).
Figure 23:
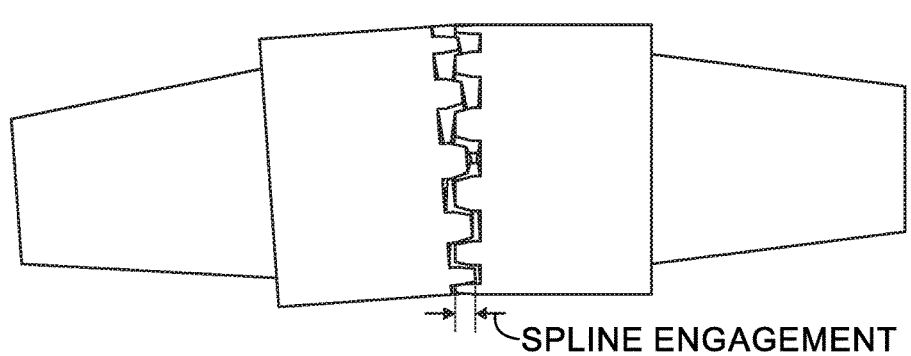
FIG. 23 is a longitudinal view of an embodiment of the drive shaft apparatus, illustrating the engagement of the torque transmitting profiles (splines).

With reference to FIGS. 22 and 23, the engagement of the end portion of the upper member 35 having the torque transmitting profiles and the end portion of the central member 30 having the torque transmitting profiles will be discussed. FIGS. 22 and 23 are longitudinal cross-section views of an embodiment of the drive shaft apparatus 10, illustrating the engagement of the torque transmitting profiles (splines). The plurality of splines provided on the end portion of the upper member 35 mate with the plurality of splines provided on the end portion of the central member 30 as shown in FIGS. 22 and 23. The engagement and interaction between the mating splines may be similar to that of beveled gears and provides a smooth operating shaft while operating at a constant velocity. In contrast, the available drive shafts currently on the market, especially clutch type shafts, do not operate at constant velocities.

As will be discussed later with more detail, each of the plurality of splines includes a crest and a root. The seat 20 and the catch 25 keep the crests of the plurality of splines on one of the upper member 35 and the central member 30 from crashing into the roots of the plurality of splines on the other of the upper member 35 and the central member 30. As discussed above, the seat 20 and the crest 25 maintain a correct amount of separation between the mating splines in order to ensure the smooth meshing of the mating splines.

Figure 24:
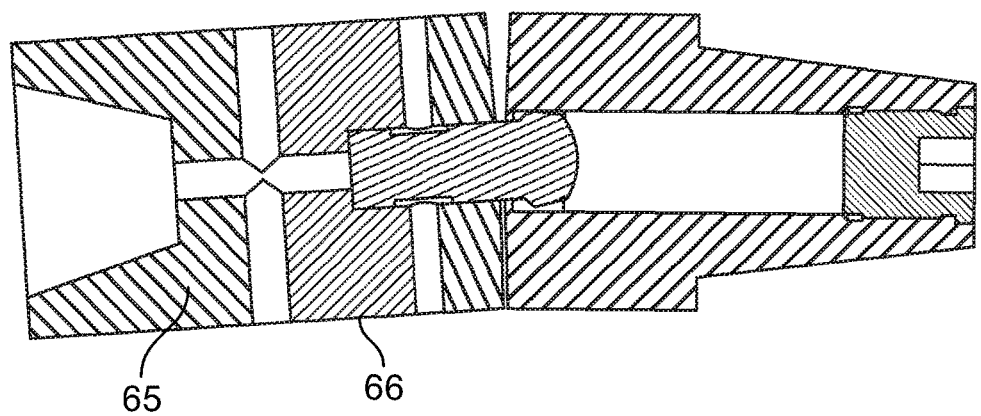
FIG. 24 is a longitudinal cross-section view of an embodiment of the drive shaft apparatus, illustrating the incorporation of a flow diverter into one end of a drive shaft apparatus.

With reference to FIGS. 23 and 24, the catch 25 and the seat 20 are configured to maintain an axial gap between the mating splines of the upper member 35 and the central member 30. The axial gap between the mating splines of the upper member 35 and the central member 30 ensure smooth operation and meshing of the mating splines. In an embodiment, the angular or rotational articulation of the drive shaft apparatus 10 is dictated by a radius of curvature of the curved end 27 of the catch 25 and a radius of curvature of the curved end 28 of the seat 20.

Figure 4:
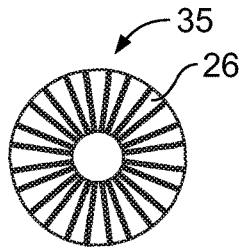
FIG. 4 is an end view of an upper member of an embodiment of the drive shaft apparatus.
Figure 5:
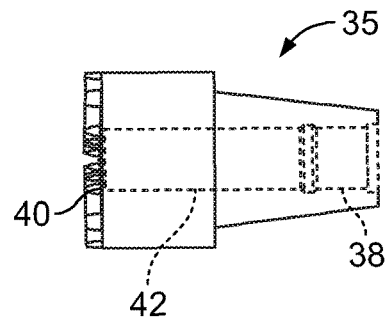
FIG. 5 is an elevation view of the upper member of an embodiment of the drive shaft apparatus.
Figure 6:
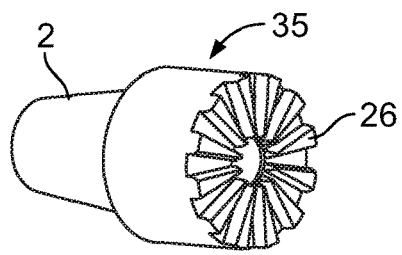
FIG. 6 is an angled view of the upper member of an embodiment of the drive shaft apparatus.

FIGS. 4-6 illustrate an upper member 35 in accordance with the first embodiment of the drive shaft apparatus 10. FIG. 4 is an end view of an upper member 35 of the first embodiment of the drive shaft apparatus 10. FIG. 5 is an elevation view of the upper member 35 of the first embodiment of the drive shaft apparatus 10. FIG. 6 is an angled view of the upper member 35 of the first embodiment of the drive shaft apparatus 10. As can be seen more clearly in FIG. 4, the upper member 35 includes a plurality of splines 26 (torque transmitting profiles discussed above). The torque transmitting profiles shown in FIG. 4 are those of an involute splines, as is well known in gears, gearing systems, transmissions etc. The involute splines 26 shown in FIG. 4 are straight, but as will be understood by persons skilled in the art, may also be helical, curved, "v" shaped, etc. as are well known in gearing applications. In further embodiments, the torque transmitting profiles may be generally shaped as modified involute splines, round profiles, triangular profiles, square profiles, trapezoidal profiles, etc. as will be understood by persons skilled in the art.

As seen more clearly in FIGS. 5 and 6, the upper member 35 includes threaded connection 2. The upper member 35 further includes an internal bore 42 housing the seat 20, thread profile 38 to provide engagement with the seat retainer 15. Moreover, the upper member 35 includes an internal shoulder 40 (i.e., a decrease in the internal diameter of the internal bore 42) to 24 provide means for retentions between a largest diameter 31 of the catch 25 (shown in FIG. 16) and the upper member 35. This retention means allows the drive shaft apparatus 10 to be assembled prior to being attached to the mud motor and simplifies the assembly process. As will be understood by persons skilled in the art, this feature may be omitted in further embodiments and is not necessary for the operation of the drive shaft apparatus 10.

FIG. 16 illustrates an elevation view of the catch 25 according to an embodiment of the drive shaft apparatus 10. As shown in FIG. 16, the catch 25 includes a curved end 25 and a portion having the largest diameter 31. Moreover, catch 25 contains a groove 24 to form a location for the set screw(s) 22 to hold the catch 25 in position. In other embodiments, these grooves 24 may be replaced with one or more flats, for instance, thereby creating a hex. The figures show two set screws 22. However, persons skilled in the art will understand that any number of desired set screws 22 may be provided in order to retain the catch 25. In various embodiments such as those shown in FIGS. 17 and 18, the grooves 24 may be omitted from the catches 25B and 25C.

FIGS. 7 and 8 illustrate an upper member 35B in accordance with as alternative embodiment of the drive shaft apparatus 10. FIG. 7 is an end view of the upper member 35B of the alternative embodiment of the drive shaft apparatus, illustrating section line C-C. FIG. 8 is a longitudinal cross-section view of the upper member 35B of the drive shaft apparatus 10. As seen in FIG. 7, the end face of the upper member 35B has a plurality of splines 26 provided thereon. An internal bore 44 of the upper member 35B includes two cutout portions 46 that correspond to protrusions 50 on the catch 25C (as illustrated in FIGS. 19-21).

Figure 19:
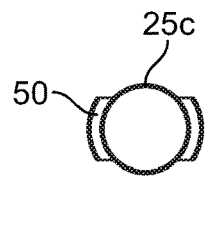
FIG. 19 is an end view of a catch according to an embodiment of the drive shaft apparatus.
Figure 20:
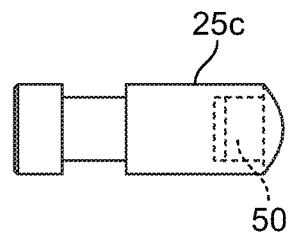
FIG. 20 is an elevation view of the catch according to an embodiment of the drive shaft apparatus.
Figure 21:
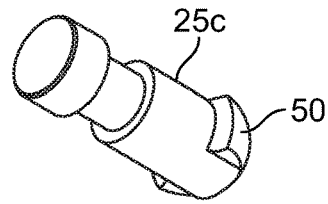
FIG. 21 is an angled view of the catch according to an embodiment of the drive shaft apparatus.

With reference to FIGS. 19-21, a catch 25C according to an embodiment of the drive shaft apparatus 10 is illustrated. FIG. 19 is an end view of the catch 25C according to the embodiment of the drive shaft apparatus 10. FIG. 20 is an elevation view of the catch 25C and FIG. 21 is an angled view of the catch 25C. As seen more clearly in FIG. 21, the catch 25C includes two protrusions 50. In operation, the catch 25C is installed into the upper member 35B, as shown in FIGS. 7 and 8, by aligning the protrusions 50 with the cutouts 46, inserting an end portion of the catch 25C into the internal bore 44 of the upper member 35B, and subsequently rotating the catch 25C to lock the protrusions 50 within internal shoulders 40B of the upper member 35B. As will be understood by persons skilled in the art, in other embodiments, any number of protrusions 50 may be provided as desired.

FIG. 8 further illustrates a first angle theta and a second angle beta. The angles theta and beta are the angles of the crests and roots of the splines 26, respectively, relative to a vertical axis, as the driver is oriented in FIG. 8. In embodiments directed to mud motor applications, the angles theta and beta range between zero (0) and up to three (3) degrees. The maximum total bend angle of the motors typically does not exceed four (4) degrees. In an embodiment, the angles theta and beta may be approximately half of the maximum mud motor bend angle plus some additional angle to account for rotor eccentricity. In an embodiment, the angles theta and beta are equal to each other. In various other embodiments, the angles theta and beta may be different from each other.

With reference to FIG. 10, a longitudinal cross-section view of an embodiment of the drive shaft apparatus is shown. As shown in FIG. 10, the upper member 35 may be articulated by an angle Alpha relative to the central member 30. In an embodiment, the angles theta and beta allow the drive shaft apparatus 10 to articulate the angle Alpha while maximizing the spline profile engagement (as shown more clearly in FIGS. 23 and 24). Maximizing the spline profile engagement spreads the torque loads over larger surface areas, thus greatly increasing the longevity of the driveshaft. In an embodiment, the plurality of splines at least partially engages 360 degrees around. In a further embodiment, the amount of engagement is also dictated by the height of each of the plurality of splines, with the amount of engagement increasing as spline height increases.

FIGS. 9 and 17 illustrate an alternative embodiment of the drive shaft apparatus 10 incorporating a catch 25B. FIG. 9 is an end view of an embodiment of the drive shaft apparatus 10, illustrating section line E-E. FIG. 17 is an elevation view of a catch 25B according to an embodiment of the drive shaft apparatus 10. More specifically, catch 25B includes a bolt 48 to retain itself within the upper member 35B.

FIGS. 11 and 12 illustrate another embodiment of a drive shaft apparatus 10 incorporating a catch 25C. FIG. 11 is an end view of the driveshaft apparatus 10, illustrating section line F-F. FIG. 12 is a longitudinal cross-section view of the drive shaft apparatus. In the exemplary embodiment, the catch 25C may use a nut 51 to retain itself within the central member 30C. The nut 51 may engage with a thread 53 provided on the catch 25C (as shown more clearly in FIG. 18) in an embodiment.

FIGS. 13-15 illustrate an alternative embodiment of an upper member 35B having a varied involute spline profile 26B. FIG. 13 is an end view of the upper member according to the alternative embodiment of the upper member 35B. FIG. 14 is an elevation view of the upper member according to the alternative embodiment of the upper member 35B. FIG. 15 is an angled view of the upper member according to the alternative embodiment of the upper member 35B.

FIG. 24 is a longitudinal cross-section view of an embodiment of the drive shaft apparatus 10, illustrating the incorporation of a flow diverter 65 into one end of the drive shaft apparatus 10. As seen in FIG. 24, the incorporation of the flow diverter 65 may reduce the overall length of the mud motor assembly. Flow diverter 65 is a tubular member positioned between the drive shaft apparatus 10 and the bearing assembly mandrel, with holes connecting its outer surface to its central bore thereby allowing fluid travelling in an annulus between the interior of the driveshaft housing and exterior surface of the drive shaft apparatus 10 into the central bore of the bearing assembly mandrel. Thus, the flow diverter 65 "diverts" fluid to the central bore of the bearing assembly so that the fluid can exit through the drilling bit. In an embodiment, the flow diverter 65 may include a hard surfacing material, such as carbide, on its outer diameter. The carbide enforced flow diverter 65 may act as an internal portion of a radial bearing assembly.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The invention claimed is:

1. A driveshaft assembly for a downhole motor for directional drilling, comprising:
    a cylindrical upper member, one end of the upper member being connected to a rotor of the downhole motor and an other end of the upper member having a plurality of torque transmitting profiles;
    an elongated central member having two ends, the two ends of the central member each having a plurality of torque transmitting profiles;
    a seat retained within a central bore of the upper member, the seat having at least one curved end; and
    an elongated catch retained within the central member, the catch having at least one curved end and extending from a position within the central member to a position outside of the central member beyond the torque transmitting profiles of the central member; wherein
    the upper member transfers torque from the rotor to the central member via the torque transmitting profiles of the other end of the upper member and the torque transmitting profiles of the central member,
    the curved end of the seat contacts the curved end of the catch while maintaining a gap between the other end of the upper member and the end of the central member,
    wherein the upper member comprises an internal bore for housing the seat, and an internal shoulder configured to retain the curved end of the catch, and wherein the curved end of the catch includes at least two protrusions; the other end of the upper member includes at least two cutouts extending from the internal bore of the upper member and corresponding to the at least two protrusions on the curved end of the catch; and the upper member is locked to the central member by inserting the curved end of the catch into the internal bore of the upper member, the protrusions on the catch being inserted into the respective cutouts, and rotating the catch within the internal bore of the upper member.

2. The driveshaft assembly of claim 1, wherein
the plurality of torque transmitting profiles of the central member are configured to at least partially engage with the plurality of torque transmitting profiles of the upper member.

3. The driveshaft assembly of claim 1, wherein
the curved end of the seat and the curved end of the catch are held in contact with each other via thrust from the rotor.

4. The driveshaft assembly of claim 1, wherein
the upper member has a central axis extending longitudinally along a length of the upper member;
the central member has a central axis extending longitudinally along a length of the central member;
the upper member is angularly displaced relative to the central member.

5. The driveshaft assembly of claim 4, wherein
the angular displacement between the upper member and the central member is between 0 to 4 degrees.

6. The driveshaft assembly of claim 4, wherein
the plurality of torque transmitting profiles on the upper member and the plurality of torque transmitting profiles on the central member each comprise a plurality of splines;
the plurality of splines each include a crest and a root;
an angle of the crest relative to a vertical axis extending perpendicular to the central axis of the upper member is between 0 to 3 degrees; and
an angle of the root relative to the vertical axis extending perpendicular to the central axis of the upper member is between 0 to 3 degrees.

7. The driveshaft assembly of claim 6, wherein
the angular displacement between the upper member and the central member is based on the angle of the crest relative to the vertical axis and the angle of the root relative to the vertical axis.

8. The driveshaft assembly of claim 7, wherein
the plurality of splines on the upper member and the plurality of splines on the central member at least partially engage each other, and
the amount of engagement is at least partially based on a height of each of the plurality of splines.

9. The driveshaft assembly of claim 4, wherein
the angular displacement between the upper member and the central member is based on a radius of the curved end of the seat and a radius of the curved end of the catch.

10. The driveshaft assembly of claim 1, wherein
the plurality of torque transmitting profiles on the other end of the upper member is shaped as at least one of involute splines, round profiles, triangular profiles, square profiles, and trapezoidal profiles.

11. The driveshaft assembly of claim 1, wherein
the plurality of torque transmitting profiles on the two ends of the central member are shaped as at least one of involute splines, round profiles, triangular profiles, square profiles, and trapezoidal profiles.

12. The driveshaft assembly of claim 1, further comprising
a seat retainer disposed within a central bore of the upper member and configured to retain the seat within the central bore of the upper member, wherein
the seat retainer is threadedly connected to the upper member.

13. The driveshaft assembly of claim 1, wherein
the catch is retained within the central member via at least one set screw.

14. The driveshaft assembly of claim 1, wherein
the catch includes a bolt to retain the catch to the central member.

15. The driveshaft assembly of claim 13, wherein
the catch includes a groove configured to receive the set screw.

16. The driveshaft assembly of claim 1, wherein
the catch includes a nut to retain the catch to the central member.

17. The driveshaft assembly of claim 1, further comprising:
a flow diverter connected to one end of the central member.

18. A downhole mud motor for directional drilling, comprising:
a power section consisting of a rotor and a stator;
a driveshaft assembly threadedly connected to the power section; and
a bearing assembly threadedly connected to the driveshaft assembly, wherein
the driveshaft assembly comprises
a cylindrical upper member, one end of the upper member being connected to the rotor and an other end of the upper member having a plurality of torque transmitting profiles;
an elongated central member having two ends, the two ends of the central member each having a plurality of torque transmitting profiles;
a seat retained within a central bore of the upper member, the seat having at least one curved end; and
an elongated catch retained within the central member, the catch having at least one curved end and extending from a position within the central member to a position outside of the central member beyond the torque transmitting profiles of the central member; wherein
the upper member transfers torque from the rotor to the central member via the torque transmitting profiles of the other end of the upper member and the torque transmitting profiles of the central member,
the curved end of the seat contacts the curved end of the catch while maintaining a gap between the other end of the upper member and the end of the central member,
wherein the upper member comprises an internal bore for housing the seat, and an internal shoulder configured to retain the curved end of the catch, and
wherein the curved end of the catch includes at least two protrusions; the other end of the upper member includes at least two cutouts extending from the internal bore of the upper member and corresponding to the at least two protrusions on the curved end of the catch; and the upper member is locked to the central member by inserting the curved end of the catch into the internal bore of the upper member, the protrusions on the catch being inserted into the respective cutouts, and rotating the catch within the internal bore of the upper member.

19. A driveshaft assembly for a downhole motor for directional drilling, comprising:

a cylindrical upper member, one end of the upper member being connected to a rotor of the downhole motor and an other end of the upper member having at least three torque transmitting profiles;

an elongated central member having two ends, the two ends of the central member each having at least three torque transmitting profiles;

a seat retained within a central bore of the upper member, the seat having at least one curved end; and an elongated catch retained within the central member, the catch having at least one curved end, a lengthwise dimension of the catch being different from a width dimension of the catch, and the catch extending from a position within the central member to a position outside of the central member beyond the torque transmitting profiles of the central member; wherein an angular displacement between the upper member and the central member is based on a radius of the curved end of the seat and a radius of the curved end of the catch, wherein the upper member comprises an internal bore for housing the seat, and an internal shoulder configured to retain the curved end of the catch, and wherein the curved end of the catch includes at least two protrusions; the other end of the upper member includes at least two cutouts extending from the internal bore of the upper member and corresponding to the at least two protrusions on the curved end of the catch; and the upper member is locked to the central member by inserting the curved end of the catch into the internal bore of the upper member, the protrusions on the catch being inserted into the respective cutouts, and rotating the catch within the internal bore of the upper member.

* * * * *